(12) United States Patent
Yeh

(10) Patent No.: US 7,203,856 B2
(45) Date of Patent: Apr. 10, 2007

(54) MOBILE COMPUTER WITH DESKTOP TYPE PROCESSOR

(75) Inventor: Shih-Ping Yeh, Taipei (TW)

(73) Assignee: Asustek Computer, Inc., Taipei (TW)

( * ) Notice: Subject to any disclaimer, the term of this patent is extended or adjusted under 35 U.S.C. 154(b) by 472 days.

(21) Appl. No.: 10/784,737

(22) Filed: Feb. 24, 2004

(65) Prior Publication Data

US 2004/0168095 A1    Aug. 26, 2004

(30) Foreign Application Priority Data

Feb. 25, 2003   (TW) .............................. 92103917 A

(51) Int. Cl.
    *G06F 1/32*   (2006.01)
(52) U.S. Cl. ........................ 713/322; 713/320
(58) Field of Classification Search ................ 713/300, 713/320, 322, 323; 710/241
    See application file for complete search history.

(56) References Cited

U.S. PATENT DOCUMENTS

| 4,270,169 | A | 5/1981 | Hunt |
| 4,805,091 | A | 2/1989 | Thiel |
| 4,908,751 | A | 3/1990 | Smith |
| 4,933,836 | A | 6/1990 | Tulpule |
| 5,133,073 | A | 7/1992 | Jackson |
| 5,170,482 | A | 12/1992 | Shu |
| 5,255,368 | A | 10/1993 | Barry |
| 5,341,504 | A | 8/1994 | Mori |
| 5,345,578 | A | 9/1994 | Manasse |
| 5,379,440 | A | 1/1995 | Kelly |
| 5,430,885 | A | 7/1995 | Kaneko |
| 5,430,887 | A | 7/1995 | Hsiao |
| 5,598,570 | A | 1/1997 | Ho |
| 5,642,524 | A | 6/1997 | Keeling |
| 5,669,008 | A | 9/1997 | Galles |
| 5,675,823 | A | 10/1997 | Hsiao |
| 5,689,722 | A | 11/1997 | Swarztrauber |
| 5,826,033 | A | 10/1998 | Hayashi |
| 5,841,775 | A | 11/1998 | Huang |
| 5,842,031 | A | 11/1998 | Barker |
| 5,842,034 | A | 11/1998 | Bolstad |
| 6,025,695 | A | * 2/2000 | Friel et al. ................ 320/106 |
| 6,038,688 | A | 3/2000 | Yoon |

(Continued)

FOREIGN PATENT DOCUMENTS

CN    1210292    3/1999

(Continued)

OTHER PUBLICATIONS

McGregor, Interconnects Target SoC Design, Microprocessor Report, Jun. 28, 2004, In-Stat/MDR Publication, Reed Electronics Group, US.

(Continued)

*Primary Examiner*—Dennis M. Butler
(74) *Attorney, Agent, or Firm*—Rabin & Berdo, P.C.

(57) ABSTRACT

A mobile computer with a desktop type processor. The mobile computer further includes a battery, a current sensor, and a clock generator. The battery supplies a current to the desktop type processor. The current sensor is coupled to the battery, and detects a value of the current supplied by the battery. When the value of the current achieves a standard value, the current sensor outputs a change signal. The clock generator is coupled to the current sensor and the desktop type processor respectively, and outputs a clock signal to the desktop type processor based on the change signal from the current sensor so as to change an operational frequency of the desktop type processor and the current supplied by the battery.

16 Claims, 3 Drawing Sheets

U.S. PATENT DOCUMENTS

| | | | |
|---|---|---|---|
| 6,230,252 | B1 | 5/2001 | Passint |
| 6,240,090 | B1* | 5/2001 | Enhager ................. 370/241.1 |
| 6,426,952 | B1 | 7/2002 | Francis |
| 6,771,497 | B2* | 8/2004 | Chen et al. ................. 361/687 |
| 7,010,704 | B2* | 3/2006 | Yang et al. ................. 713/300 |
| 2002/0018470 | A1 | 2/2002 | Galicki |
| 2002/0018480 | A1 | 2/2002 | Galicki |
| 2002/0027908 | A1 | 3/2002 | Kalkunte |
| 2002/0027912 | A1 | 3/2002 | Galicki |
| 2002/0085578 | A1 | 7/2002 | Dell |
| 2002/0105972 | A1 | 8/2002 | Richter |
| 2003/0204762 | A1* | 10/2003 | Lee et al. ................. 713/322 |
| 2004/0078606 | A1* | 4/2004 | Chen et al. ................. 713/300 |

FOREIGN PATENT DOCUMENTS

| | | |
|---|---|---|
| CN | 1282897 | 2/2001 |
| CN | 1294328 | 5/2001 |
| CN | 1338067 | 2/2002 |
| TW | 330258 | 4/1998 |
| TW | 454117 | 9/2001 |
| TW | 461167 | 10/2001 |

OTHER PUBLICATIONS

Galicki, Multiprocessing I/O Enables Efficient 3G Base-Station Designs, EDN, Jul. 24, 2003, Reed Electronics Group, Highland Ranch CO.

Galicki, Connectivity Fabric Eases Base-Station Woes, Wireless Systems Design, Jun. 2003, Penton Technology Media, Paramus NJ.

Galicki, FPGAs Have the Multiprocessing I/O Infrastructure to Meet 3G Base Station Design Goals, Spring 2003, Xcell Journal, Xilinx, San Jose, CA.

* cited by examiner

241

| normal value | A |
|---|---|
| reduced value | B |

MOBILE COMPUTER WITH DESKTOP TYPE PROCESSOR

BACKGROUND OF THE INVENTION

1. Field of the Invention

The invention relates to a mobile computer with a desktop type processor; in particular, to a mobile computer in which battery life is maintained by a power management method.

2. Description of the Related Art

The difference between a processor for a mobile computer and a desktop type processor is that the former is a chip designed based on the requirements of a mobile computer. Specifically, since the space inside the mobile computer is small, heat-dissipation is limited. Additionally, battery life is also limited. Thus, processor size and power consumption place severe limitations on mobile computer designs. As a result, the wafer for manufacturing the processor for the mobile computer must be tested and conform to more strict specifications. Furthermore, the most advanced circuit technology is applied to mobile computer processors in order to achieve performance comparable to a desktop type processor. In addition, the processor for the mobile computer is typically driven by a lower operation voltage. Thus, waste heat and power consumption are lower than in a desktop computer.

Furthermore, mobile computer processors with clock speed equal to their desktop counterparts are more expensive. Specifically, the difference in price between a mobile processor and a desktop processor is around 200–500 dollars. Due to this price difference, several manufacturers have replaced mobile processors with desktop processors in mobile computers. Thus, reducing the overall cost of the mobile computer.

Referring to FIG. 1, in the conventional mobile computer 10 with a desktop type processor, an external battery 11 supplies power to the mobile computer by an inner system power supply 12. The inner system power supply 12 powers the clock generator 13, a desktop type processor 14, a chipset 15, and a memory 16. It is noted that the clock generator 13 outputs a clock signal to the desktop type processor 14, the chipset 15, and the memory 16 so as to provide operational frequencies required by the desktop type processor 14, the chipset 15, and the memory 16.

When a large amount of the data is calculated by the desktop type processor 14, the amount of current required by the desktop type processor 14 increases correspondingly. At this time, the amount of the current supplied by the battery 11 may exceed the maximum amount of the current that the battery 11 can supply. Thus, the life of the battery 11 may decrease.

To extend the life of the battery 11, a switch is additionally disposed in the conventional mobile computer with the desktop type processor. When the amount of the current supplied by the battery exceeds a maximum level, a circuit in the mobile computer is automatically turned off by the switch. Thus, the amount of the current supplied by the battery is prevented from exceeding its maximum level Although the lifetime of the battery can be properly maintained by the above manner, it is inconvenient for the user. Specifically, since the circuit is directly turned off by the switch, the mobile computer may be shut down accidentally.

SUMMARY OF THE INVENTION

In view of this, the invention provides a mobile computer, with a desktop type processor, that maintains battery life by a power management method.

Accordingly, the invention provides a mobile computer with a desktop type processor. The mobile computer further includes a battery, a current sensor, and a clock generator. The battery supplies a current to the desktop type processor. The current sensor is coupled to the battery, and detects a value of the current supplied by the battery. When the value of the current achieves a standard value, the current sensor outputs a change signal. The clock generator is coupled to the current sensor and the desktop type processor respectively, and outputs a clock signal to the desktop type processor based on the change signal from the current sensor so as to change the operational frequency of the desktop type processor and the current supplied by the battery.

In a preferred embodiment, the clock generator includes a transformation table therein so that the clock generator generates the clock signal from the change signal with reference to the transformation tables.

In another preferred embodiment, the mobile computer further includes a chipset coupled to the clock generator. The operational frequency of the chipset changes based on the operational frequency of the desktop type processor.

In another preferred embodiment, the mobile computer further includes a memory coupled to the clock generator. The operational frequency of the memory changes based on the operational frequency of the desktop type processor.

In another preferred embodiment, the operational frequency of the desktop type processor is linearly changed.

In this invention, a power management method for a mobile computer with a desktop type processor and a battery is provided. The method includes the following steps. A standard value is provided. When a value of a current supplied by the battery is greater than the standard value, an operational frequency of the desktop type processor is reduced.

In a preferred embodiment, the reduction of the operational frequency of the desktop type processor is linearly changed.

In another preferred embodiment, the method further includes a step of providing a transformation table. The reduction of the operational frequency of the desktop type processor is performed with reference to the transformation table.

In another preferred embodiment, the method further includes a step of increasing the operational frequency of the desktop type processor when the value of the current supplied by the battery is lower than the standard value.

Furthermore, the increase of the operational frequency of the desktop type processor is linearly changed.

In another preferred embodiment, the method further includes a step of providing a transformation table. The increase of the operational frequency of the desktop type processor is performed with reference to the transformation table.

In another preferred embodiment, the mobile computer further includes a chipset, and the method further includes a step of determining an operational frequency of the chipset from the operational frequency of the desktop type processor.

In another preferred embodiment, the mobile computer further includes a memory, and the method further includes a step of determining an operational frequency of the memory from the operational frequency of the desktop type processor.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
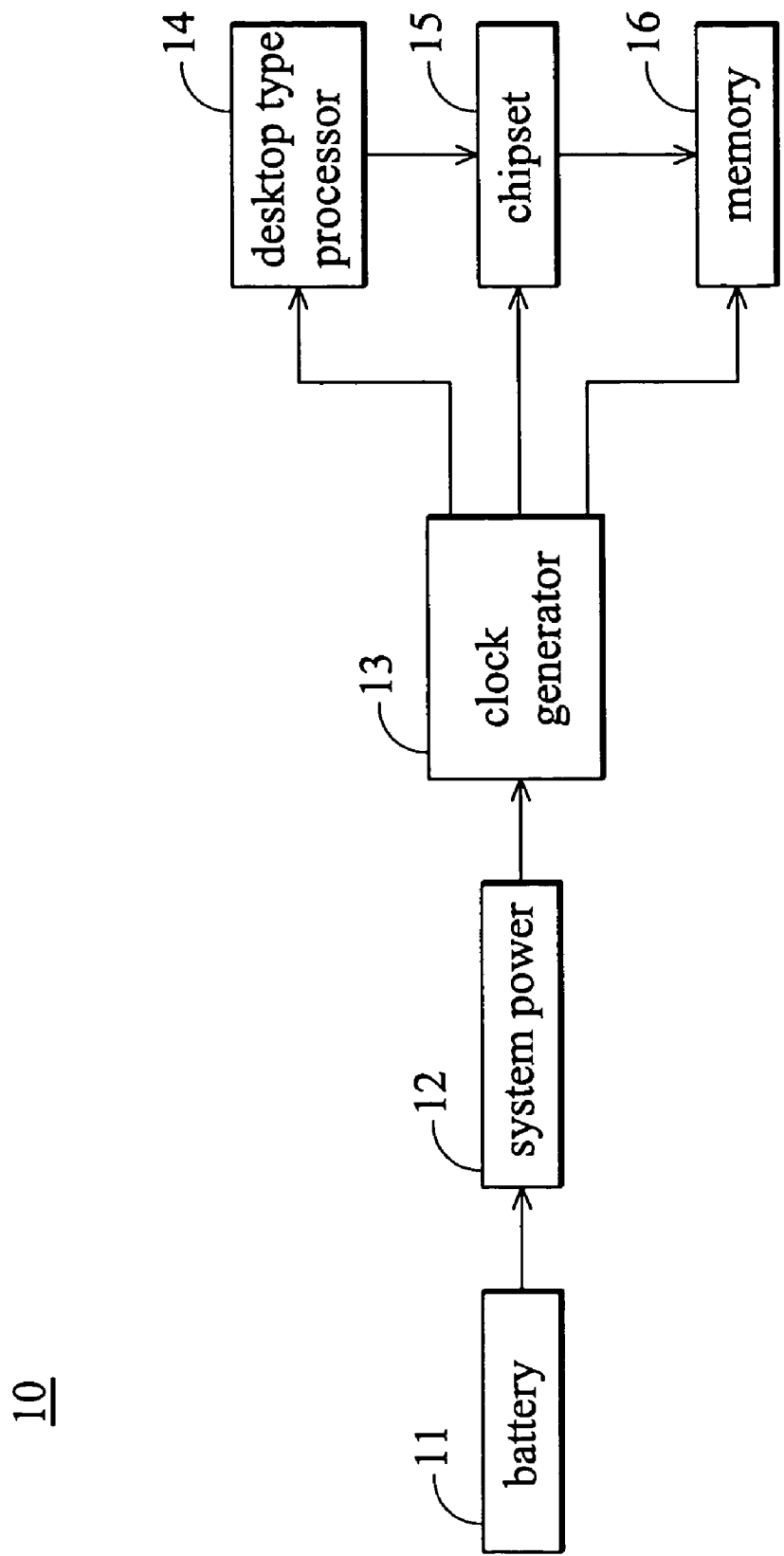
FIG. 1 is a block diagram of a conventional mobile computer with a desktop type processor.
Figure 2:
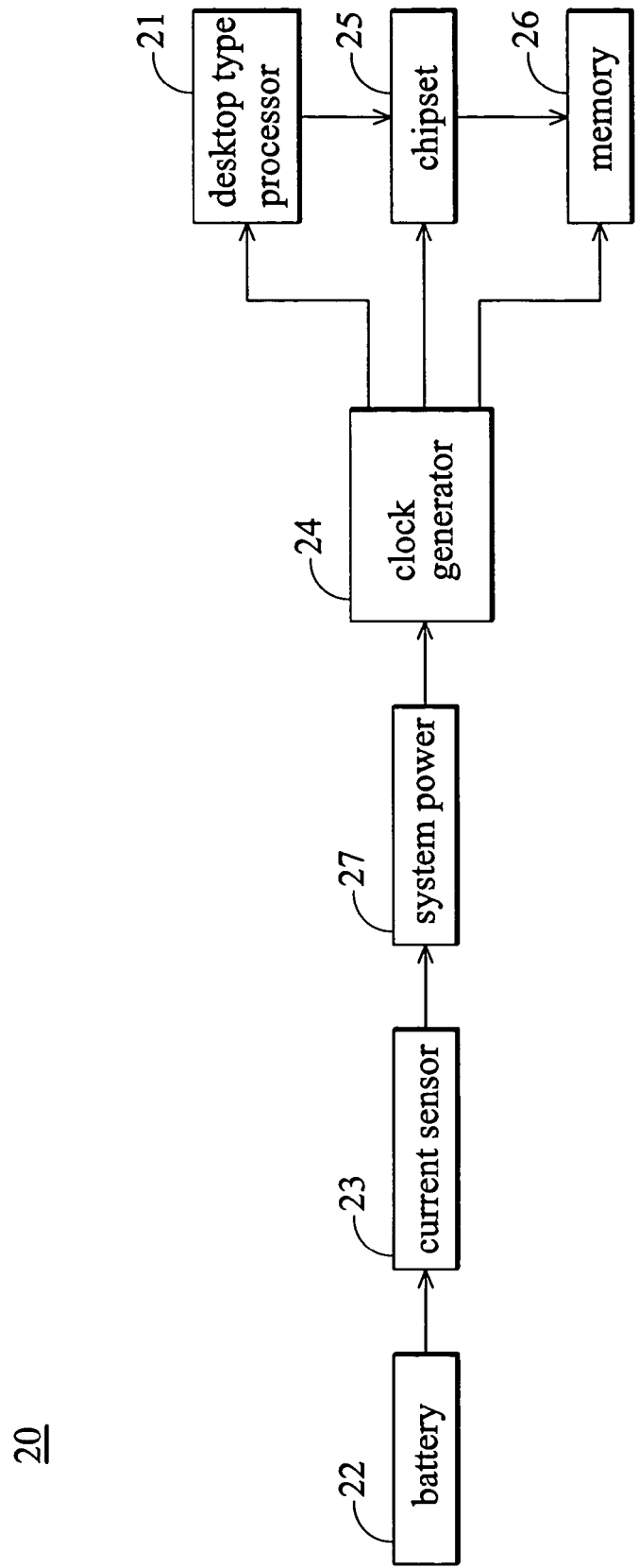
FIG. 2 is a block diagram of a mobile computer with a desktop type processor as disclosed in this invention.

FIG. 2 shows a mobile computer 20, with a desktop type processor 21, as disclosed in this invention. The mobile computer 20 further includes a battery 22, a current sensor 23, a clock generator 24, a chipset 25, a memory 26, and a system power supply 27.

The desktop type processor 21 is used as an operation center of the mobile computer 20, and is coupled to the clock generator 24. It is noted that the desktop type processor 21 is directly coupled to the clock generator 24 in FIG. 2. However, it is not limited to this. For example, the desktop type processor 21 may be coupled to the clock generator 24 via the chipset 25.

The battery 22 supplies a current to the desktop type processor 21. It is noted that before current is supplied by the battery 21 to the desktop type processor 21, the clock generator 24, the chipset 25, and the memory 26, it first supplies power to the system power supply 27 disposed inside the mobile computer 20. Then, by means of the system power supply 27, current supplied by the battery 22 is converted to current adaptable by the desktop type processor 21, the clock generator 24, the chipset 25, and the memory 26.

The current sensor 23 is coupled to the battery 22, and detects a value of the current supplied by the battery 22. When the current value achieves a standard value (i.e. a maximum current value that the battery 21 can supply), the current sensor 23 outputs a change signal to the clock generator 24.

The clock generator 24 is coupled to the current sensor 23, the desktop type processor 21, the chipset 25, and the memory 26 respectively, and outputs a clock signal to the desktop type processor 21 based on the change signal from the current sensor 23 so as to change an operational frequency of the desktop type processor 21. Thus, the current supplied by the battery 22 also changes.

Furthermore, the clock generator 24 includes a transformation table 241 therein so that the clock generator 23 generates the clock signal from the change signal with reference to the transformation table 241. For example, the transformation table 241 may be shown in FIG. 3, and is divided into a normal value A and a reduced value B. When the current value supplied by the battery 22 is greater than the standard value, the operational frequency of the desktop type processor 21 is changed to the reduced value B from the normal value A with reference to the transformation table 241 so as to reduce the current supplied by the battery 22. In contrast, when the current value supplied by the battery 22 is lower than the standard value, the operational frequency of the desktop type processor 21 is changed to the normal value A from the reduced value B with reference to the transformation table 241 so that the desktop type processor can operate at its normal operational frequency. It is understood that the transformation table in FIG. 3 is just an example, and is not limited to this.

The chipset 25 is coupled to the clock generator 24, and can assist the desktop type processor 21. Furthermore, an operational frequency of the chipset 25 is changed based on the operational frequency of the desktop type processor 21. However, the chipset 25 can be independently operated.

The memory 26 is coupled to the clock generator 24. An operational frequency of the memory 26 is changed based on the operational frequency of the desktop type processor 21. However, the memory 26 can be independently operated.

Figures 3, 4:
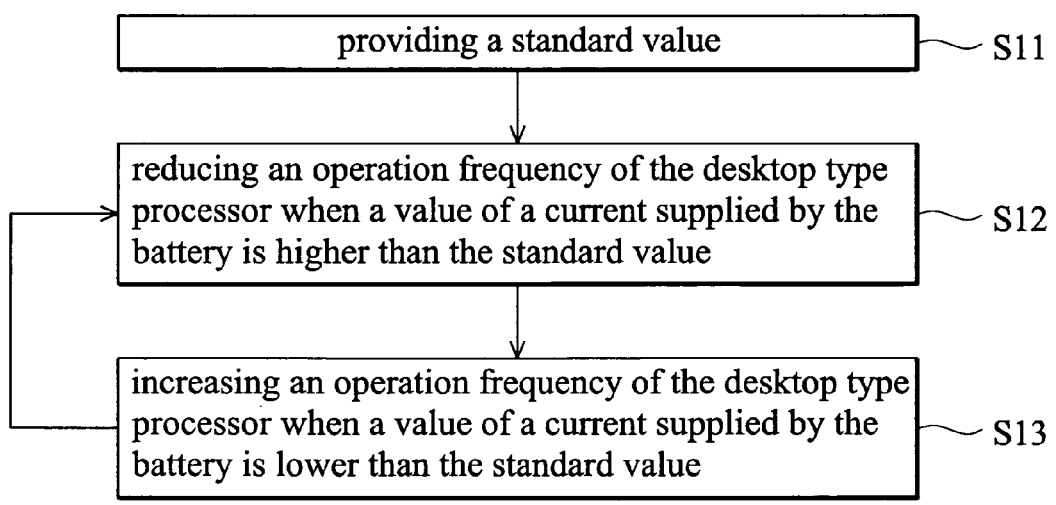
FIG. 3 is a schematic view of a transformation table as disclosed in this invention.
FIG. 4 is a flow chart of a power management method as disclosed in this invention.

Referring to FIG. 4, a power management method for a mobile computer with a desktop type processor, as disclosed in this invention, includes the following steps. First, a standard value is provided as shown in step S11. Specifically, the standard value is the maximum value that the battery 22 can supply, and can be obtained by the specification from the manufacturer. Then, by the current sensor 23 detecting the current value supplied by the battery 22, when the current value supplied by the battery 22 is greater than the standard value, the operational frequency of the desktop type processor 21 is reduced with reference to the transformation table 241 so as to reduce the current value supplied by the battery 22, as shown in step S12. Subsequently, by the current sensor 23 continuously detecting the current value supplied by the battery 22, when the current value supplied by the battery 22 is lower than the standard value, the operational frequency of the desktop type processor 21 is increased with reference to the transformation table 241 so as to increase the current value supplied by the battery 22, as shown in step S13. Thus, the desktop type processor 21 can operate at a normal operational frequency.

It is understood that the step S12 and the step S13 are repeatedly in a loop manner. Thus, the battery cannot operate in an overcurrent situation, and the desktop type processor 21 can operate at a normal operational frequency.

Furthermore, the operational frequency of the desktop type processor 21 is changed linearly.

In the power management method as disclosed in this invention, when the current value is greater than the maximum value that the battery can supply, the current value supplied by battery 22 is reduced by reducing the operational frequency of the desktop type processor 21. Thus, unlike the conventional method, the current supplied to the desktop type processor 21 is not completely cut off. As a result, the mobile computer of this invention cannot be shut down accidentally.

As stated above, since the battery avoids continuous operation in an overcurrent situation, battery life can be optimally maintained. In addition, to maintain battery life, the power management method is achieved by reducing the operational frequency of the desktop type processor. Thus, unlike a conventional mobile computer, the mobile computer of the invention cannot be shut down accidentally.

While the invention has been described by way of example and in terms of the preferred embodiment, it is to be understood that the invention is not limited to the disclosed embodiment. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile computer comprising:
   a desktop type processor;
   a battery for supplying a current to the desktop type processor;
   a current sensor, coupled to the battery, for detecting a value of the current supplied by the battery, wherein the current sensor outputs a change signal when the value of the current achieves a standard value; and
   a clock generator, coupled to the current sensor and the desktop type processor respectively, for outputting a clock signal to the desktop type processor based on the change signal from the current sensor so as to change an operational frequency of the desktop type processor and the current supplied by the battery, wherein the operational frequency of the desktop type processor is changed linearly.

2. The mobile computer as claimed in claim 1, wherein the clock generator includes a transformation table therein so that the clock generator generates the clock signal from the change signal with reference to the transformation table.

3. The mobile computer as claimed in claim 1, further comprising:
   a chipset coupled to the clock generator, wherein an operational frequency of the chipset is changed based on the operational frequency of the desktop type processor.

4. The mobile computer as claimed in claim 1, further comprising:
   a memory coupled to the clock generator, wherein an operational frequency of the memory is changed based on the operational frequency of the desktop type processor.

5. A power management method for a mobile computer with a desktop type processor and a battery, comprising:
   providing a standard value; and
   linearly reducing an operational frequency of the desktop type processor when a value of a current supplied by the battery is greater than the standard value.

6. The method as claimed in claim 5, further comprising:
   providing a transformation table, wherein the reduction of the operational frequency of the desktop type processor is performed with reference to the transformation table.

7. The method as claimed in claim 5, further comprising:
   increasing the operational frequency of the desktop type processor when the value of the current supplied by the battery is less than the standard value.

8. The method as claimed in claim 7, wherein the increase of the operational frequency of the desktop type processor is linearly changed.

9. The method as claimed in claim 7, further comprising:
   providing a transformation table, wherein the increase of the operational frequency of the desktop type processor is performed with reference to the transformation table.

10. The method as claimed in claim 5, wherein the mobile computer further includes a chipset, and the method further comprises:
    determining an operational frequency of the chipset from the operational frequency of the desktop type processor.

11. The method as claimed in claim 5, wherein the mobile computer further includes a memory, and the method further comprises:
    determining an operational frequency of the memory from the operational frequency of the desktop type processor.

12. A power management method for a mobile computer with a desktop type processor and a battery, comprising:
    providing a standard value;
    reducing an operational frequency of the desktop type processor when a value of a current supplied by the battery is greater than the standard value; and
    linearly increasing the operational frequency of the desktop type processor when the value of the current supplied by the battery is less than the standard value.

13. The method as claimed in claim 12, further comprising:
    providing a transformation table, wherein the reduction of the operational frequency of the desktop type processor is performed with reference to the transformation table.

14. The method as claimed in claim 12, further comprising: providing a transformation table, wherein the increase of the operational frequency of the desktop type processor is performed with reference to the transformation table.

15. The method as claimed in claim 12, wherein the mobile computer further includes a chipset, and the method further comprises:
    determining an operational frequency of the chipset from the operational frequency of the desktop type processor.

16. The method as claimed in claim 12, wherein the mobile computer further includes a memory, and the method further comprises:
    determining an operational frequency of the memory from the operational frequency of the desktop type processor.

* * * * *